United States Patent
Whitehead

(10) Patent No.: US 7,299,582 B1
(45) Date of Patent: Nov. 27, 2007

(54) FISHING HOOK RIG AND LURE CONTAINER

(76) Inventor: Marcus Whitehead, 1380 NW. 86th Way, Coral Springs, FL (US) 33071

( * ) Notice: Subject to any disclaimer, the term of this patent is extended or adjusted under 35 U.S.C. 154(b) by 0 days.

(21) Appl. No.: 11/408,531

(22) Filed: Apr. 21, 2006

Related U.S. Application Data

(60) Provisional application No. 60/674,906, filed on Apr. 26, 2005.

(51) Int. Cl.
*A01K 87/00* (2006.01)
(52) U.S. Cl. .................................... 43/25.2
(58) Field of Classification Search ................ 43/25.2; D22/144
See application file for complete search history.

(56) References Cited

U.S. PATENT DOCUMENTS

| | | | | |
|---|---|---|---|---|
| 1,216,069 A | * | 2/1917 | Cammack | 43/25.2 |
| 2,767,502 A | * | 10/1956 | Reynolds | 43/25.2 |
| 2,849,825 A | * | 9/1958 | Reisner | 43/25.2 |
| 4,015,361 A | * | 4/1977 | O'Reilly et al. | 43/25.2 |
| 4,452,003 A | * | 6/1984 | Deutsch et al. | 43/25.2 |
| 4,884,357 A | * | 12/1989 | Clifford | 43/25.2 |
| 4,936,040 A | * | 6/1990 | Reiter et al. | 43/25.2 |
| 5,199,208 A | | 4/1993 | Matchette | |
| 5,233,783 A | * | 8/1993 | Roebuck et al. | 43/25.2 |
| 5,475,942 A | * | 12/1995 | Tatum | 43/25.2 |
| 5,588,245 A | | 12/1996 | Vance | |
| 5,625,977 A | | 5/1997 | Medford | |
| 5,992,082 A | | 11/1999 | Barefoot | |
| 6,023,876 A | | 2/2000 | Haddad et al. | |
| 6,301,825 B1 | | 10/2001 | Doreian | |
| 2005/0091906 A1 | * | 5/2005 | D'Alusio | 43/25.2 |
| 2005/0160657 A1 | * | 7/2005 | Dodge | 43/25.2 |

* cited by examiner

*Primary Examiner*—Kurt Rowan
(74) *Attorney, Agent, or Firm*—Gold & Rizvi, P.A.; H. John Rizvi; Glenn E. Gold

(57) ABSTRACT

A fishing hook rig and lure container for safely and conveniently storing and transporting fishing hook rigs and lures. The container is configured for one-handed manual operation for opening a movable cover section to gain access to a compartment. The compartment is configured to receive a fishing hook rig or lure, which is tied on a fishing line and the movable cover section closes for enclosing the fishing hook rig or lure within the container. The compartment includes a lower line port and the movable cover section includes an upper line port, both of which cooperate to form a bore for protectively confining the fishing line. A securing hook is provided on the exterior of the compartment for engaging a stationary fitting on a fishing rod and reel set to retain the container.

2 Claims, 12 Drawing Sheets

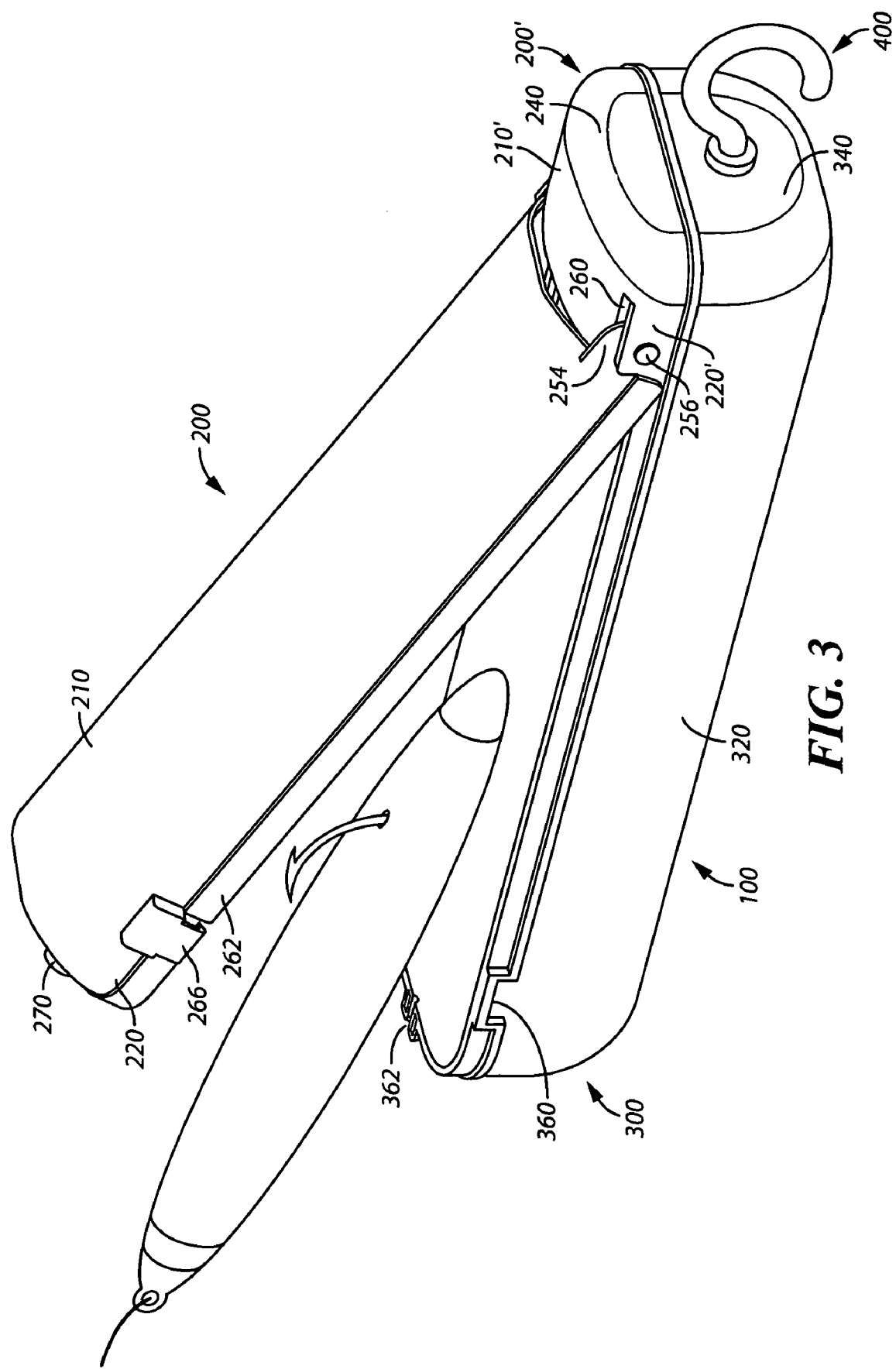

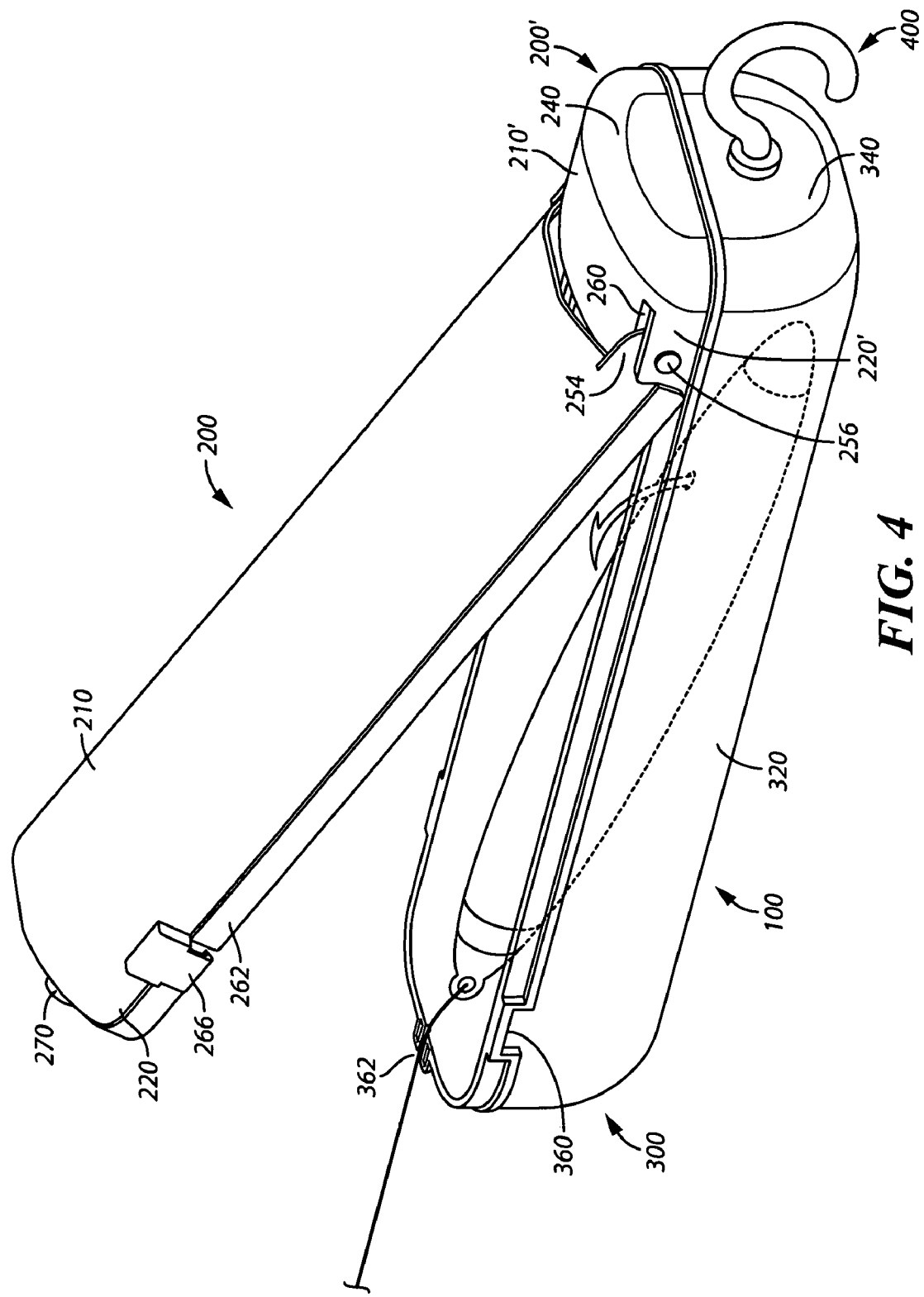

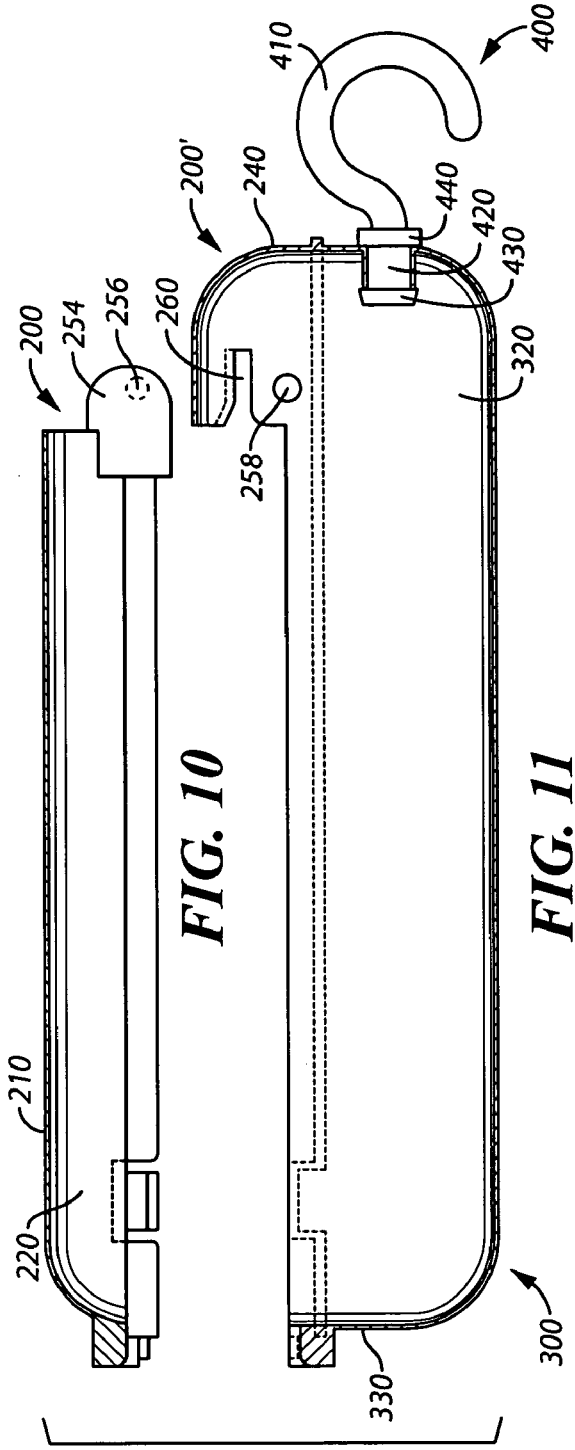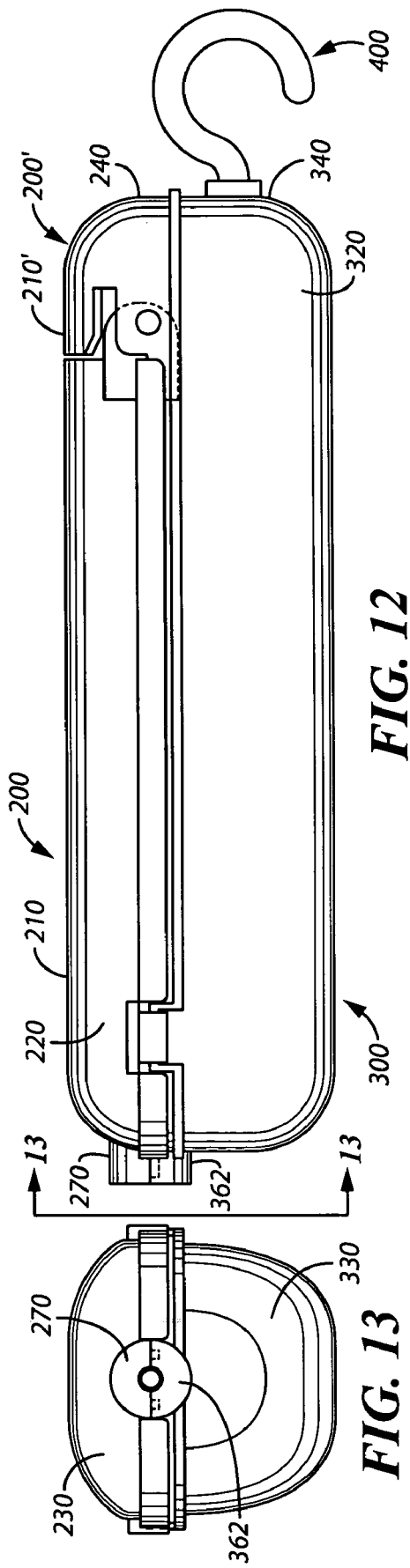

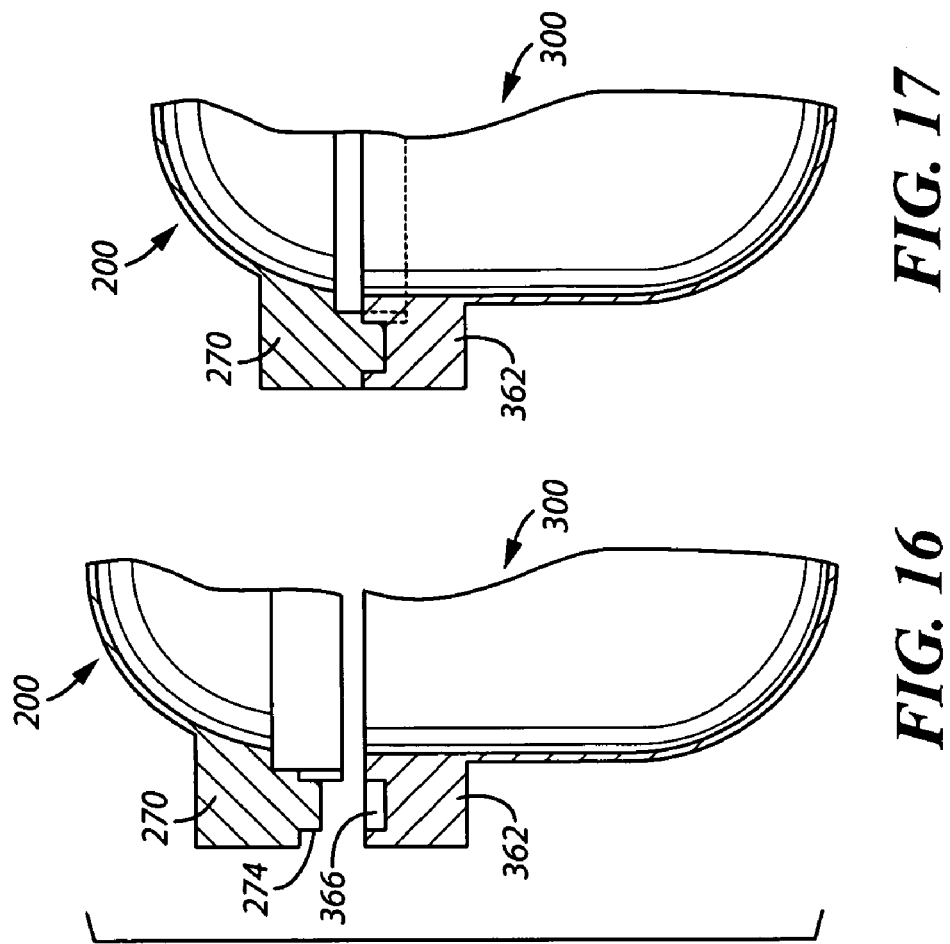
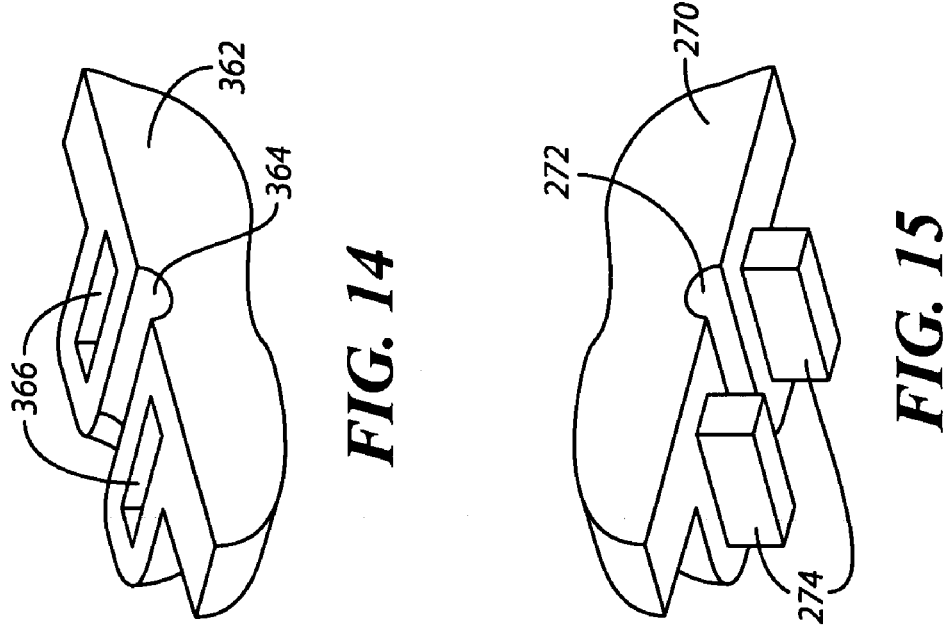

FISHING HOOK RIG AND LURE CONTAINER

CROSS-REFERENCE TO RELATED APPLICATION

This application claims the benefit of co-pending U.S. Provisional Patent Application Ser. No. 60/674,906, filed Apr. 26, 2005, which is incorporated herein in its entirety.

BACKGROUND OF THE INVENTION

1. Field of the Invention

The present invention relates generally to recreational fishing equipment and more particularly to a fishing hook rig, and lure container which encloses fishing hooks and lures in a conveniently accessible container to prevent injury and tangled lines resulting from exposed fishing hook rigs and lures contacting individuals and equipment.

2. Description of the Prior Art

Recreational fishermen typically use fishing rod and reel sets together with an assortment of fishing equipment, which is stored and carried in a tackle box or other container. Fishing equipment includes fishing hook rigs and lures, each of which has one or more barbed fish hooks attached. Inside a tackle box fishing hook rigs and lures with exposed fish hooks tend to become entangled with other fishing hook rigs, lures, and other equipment. The barbed hooks commonly used for fishing readily become engaged with other objects. Untangling the barbed hooks is a tedious and frustrating process.

For convenience, recreational fishermen often leave a fishing hook rig or lure attached to a fishing line, on a fishing rod and reel set. The fishing hook rig or lure may have multiple fish hooks. Typically, an exposed fish hook is engaged with a guide loop, of the fishing rod and the reel is operated to draw the fishing line taught, so that the fishing hook rig or lure is retained, under tension, adjacent to the fishing rod. The fish hook, which is engaged with the guide loop and other fish hooks, on the fishing hook rig or lure, are exposed. The exposed fish hooks are likely to contact skin or clothing of fishermen and are likely to become entangled with the fishing line on other fishing rods or other equipment.

The difficulty with exposed fish hooks contacting skin, clothing and other fishing equipment has been addressed by designing containers for storing a relatively small number of fishing lures or fishing hook rigs. The containers completely enclose the fishing hook rigs or lures and prevent individuals and equipment from contacting the exposed fish hooks. Containers have also been designed to enclose a single fishing hook rig or lure, which is attached to a fishing line on a rod and reel set. The containers serve to house fishing hook rigs and lures when not in use, as well as when the fishing equipment is being transported.

When containers of the prior art are used to enclose a fishing hook rig or lure, which is attached to a fishing line on a rod and reel set, the fishing line must pass into the container where the fishing hook rig or lure is stored and the container must be closed. The closures typically have opposed overlapping edges, which obstruct free passage and crimp of chafe the fishing line, weakening the affected area. The fishing line may fail during use, causing the loss of the fishing hook rig or lure, together with the potential catch. Containers have been provided with an opening through which the fishing line may be threaded before the container closure has been engaged but the openings tend to be relatively small and difficult to thread. If the fishing line does not remain in position, within the opening, when the closure is engaged, the fishing line will be crimped.

Fishing lures are produced in a range of sizes from minnow shaped plugs to larger lures, such as large lipped plugs, top water lures, large cone head lures, jet head lures, magnum trolling plugs, and other relatively large lures and rigs. Containers of the prior art are not available in a range of sizes so as to accommodate the full range of fishing lures used by recreational fishermen.

While the prior art containers are convenient for storing fishing hook rigs and lures inside a tackle box, the most advantageous use is in enclosing the fishing hook rigs and lures, which are attached to a fishing line on a rod and reel set. A fisherman typically uses both hands to maneuver the container to receive the fishing hook rig or lure and to operate the closure mechanism for enclosing the fishing hook rig or lure. Some means must be devised to suspend the fishing hook rig or lure from the fishing line, in a relatively static position, so that it may be received into the container. The process is somewhat inconvenient. Also, in removing a fishing hook rig or lure, a fisherman must use both hands to open the container, making it difficult to steady the fishing rod and reel set, and avoid having the fishing hook rig or lure swing freely and snag clothing, equipment or a fisherman. Containers of the prior art often include a tensioned clip to retain the container in engagement with the fishing rod. The clips have a tendency to slide along the rod and can scratch the rod, bend the guide loops, or cause the inserts to fail.

Accordingly, there is a need for a fishing hook rig and lure container, which is configured to conveniently receive the fishing line into an unobstructed bore for passing the line into the container, without crimping. There is a need for containers constructed in a range of sizes for containing fishing hook rigs and lures in the full range of sizes. There is a need for a container configured for one-handed operation to open the container, insert the fishing hook rig or lure, and close the container. There is a need for a container having a fitting for engaging with a fishing rod or other equipment, which will not slide and scratch the rod.

SUMMARY OF THE INVENTION

The present invention is directed to a fishing hook rig and lure container, which is configured for convenient one-handed operation to receive and enclose one or more fishing hook rigs or lures. The container has an inner storage space and an exterior surface. Cover means are provided to enclose the fishing hook rigs or lures within the inner storage space. Cover means are operable to selectively allow access to the inner storage space. A straight bore is provided for maintaining an unobstructed passage for the fishing line attached to the fishing hook rig or lure, in the container. A securing hook is mounted on the exterior surface, of the container, for engaging the fishing rod and reel set.

An object of the present invention is to provide a container having manually operable cover means configured for one-handed operation.

It is another object of the present invention to provide a container having a straight bore to allow unobstructed passage of a fishing line.

It is a further object of the present invention to provide containers in a range of sizes to accommodate the full size range of fishing hook rigs and lures.

It is yet another object of the present invention to provide a container having a securing hook which can engage a portion of a fishing rod without causing cosmetic or structural damage to the fishing rod.

These and other objects, features and advantages of the present invention will become more readily apparent from the attached drawings and the detailed description of the preferred embodiments, which follow.

BRIEF DESCRIPTION OF THE DRAWINGS

The invention will be further understood, by way of example, with reference to the accompanying drawings, in which:

FIG. 3 is a rear perspective view of the container of the present invention showing the movable cover section in open position and a fishing lure partially inserted.

FIG. 4 is a rear perspective view of the container of the present invention with the movable cover section in open position, a fishing lure inserted and a fishing line lying in a lower line port.

FIG. 10 is a side elevation view of the movable cover section of the present invention.

FIG. 11 is a side elevation view of the compartment of the present invention.

FIG. 12 is a side elevation view of the container of the present invention.

FIG. 13 is a front elevation view of the container of the present invention.

FIG. 14 is a cross section perspective view of the lower line port.

FIG. 15 is a cross section perspective view of the upper line port.

FIG. 16 is a partial side elevation view of the container of the present invention shown with the movable cover section raised.

FIG. 17 is a partial side elevation view of the container of the present invention shown with the movable cover section closed.

DETAILED DESCRIPTION OF THE PREFERRED EMBODIMENTS

Figure 2:
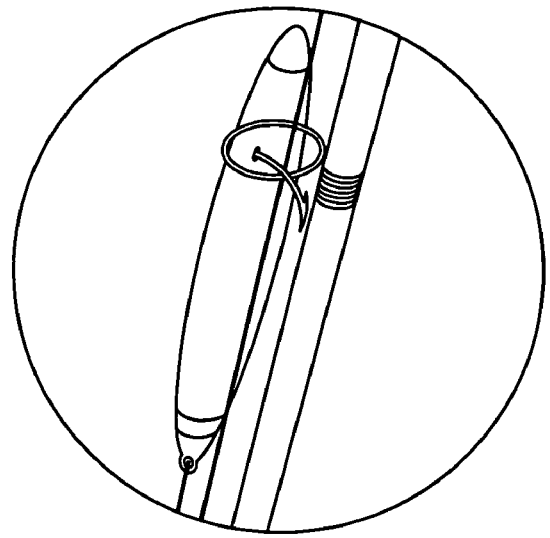
FIG. 2 is a close-up view of the portion of the fishing rod, to which the fishing lure is engaged, and indicated by a reference circle shown in FIG. 1.
Figure 1:
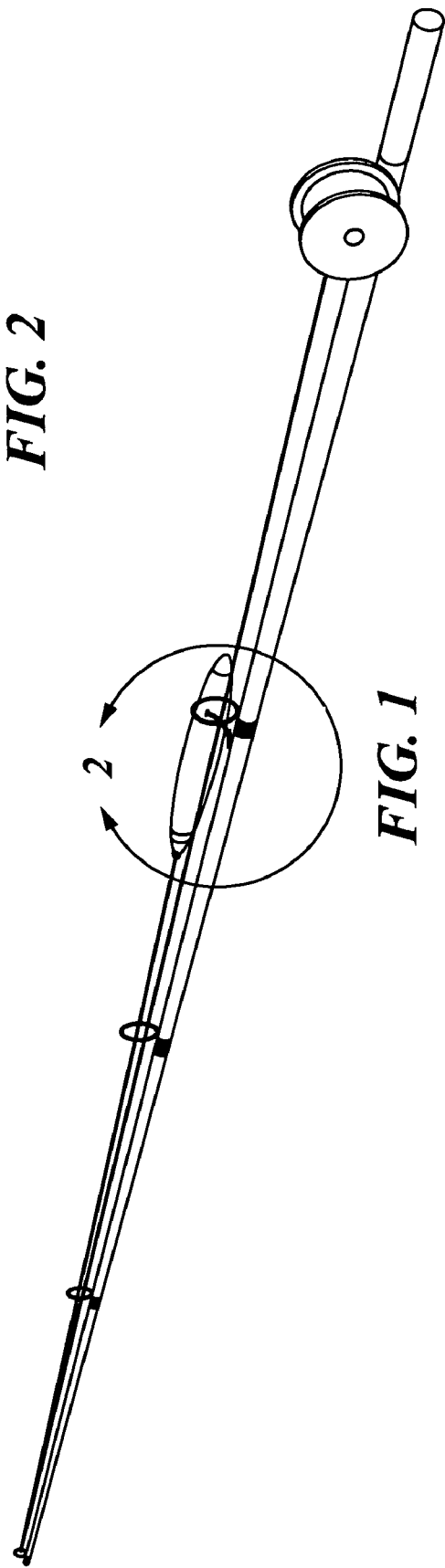
FIG. 1 is a side perspective view of a fishing rod and reel set with a fishing lure attached to the fishing line and an exposed fish hook engaged with a guide loop to retain the fishing lure, according to conventional practice.

Shown throughout the drawings, the present invention is generally directed toward fishing hook rig and lure container that is configured for one-handed operation to conveniently enclose a fishing hook rig or lure in a compartment, for storage or transport; thereby; eliminating injury, tangling and snagging from exposed fish hooks. The present invention may be used to enclose fishing hook rigs or lures, which are not attached to a fishing line, but the primary benefit is obtained when the present invention is used to enclose fishing hook rigs or lures, which are attached to a fishing line, on a fishing rod and reel set. The conventional method of securing a fishing lure is shown in FIG. 1, which includes an inset circle shown as a close-up view in FIG. 2. A fish hook, on the fishing lure is engaged inside a guide loop of the fishing rod and the fishing reel is operated to apply tension to the fishing line and secure the fishing lure adjacent to an intermediate portion of the fishing rod. The fishing lure is secure but the fish hook is exposed.

Figure 5:
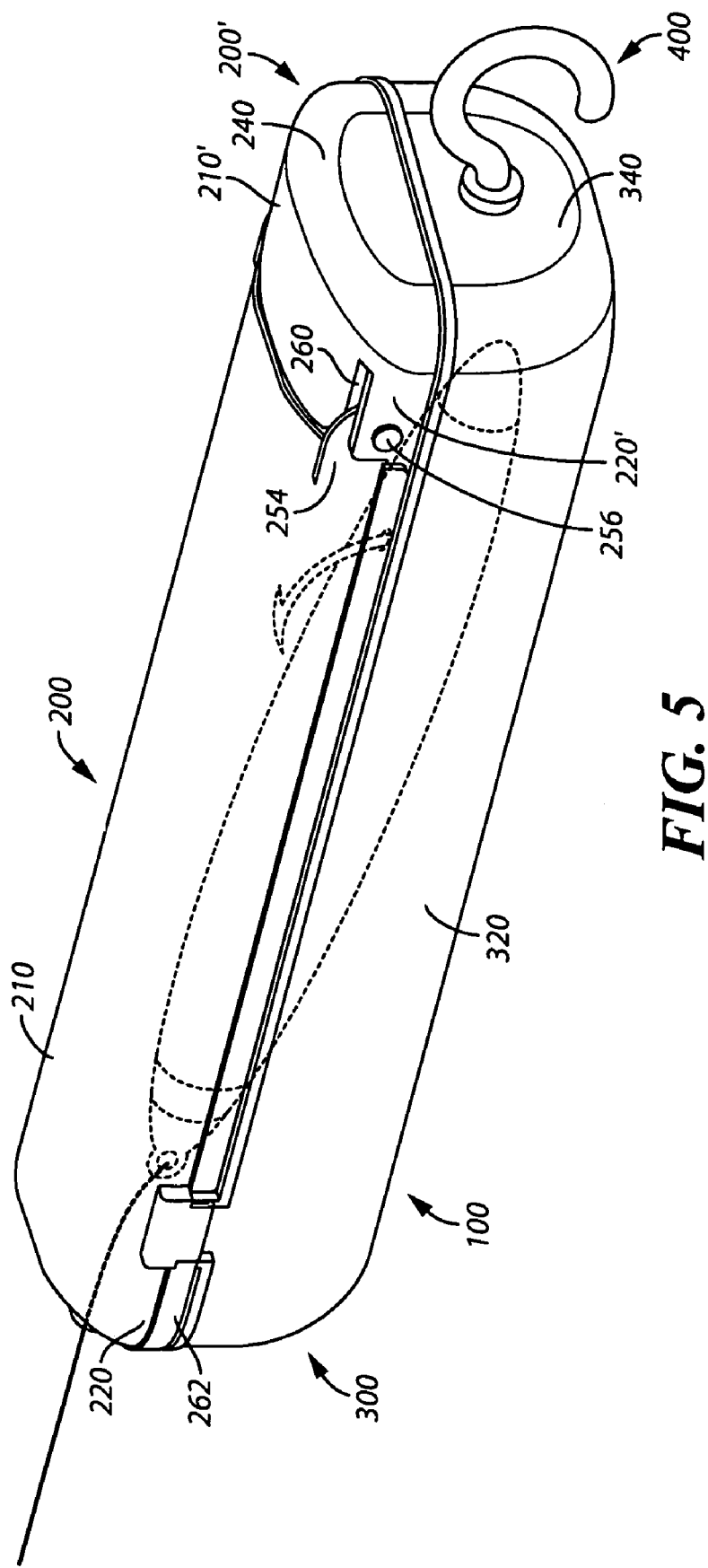
FIG. 5 is a rear perspective view of the present invention showing the movable cover section in closed position.
Figure 6:
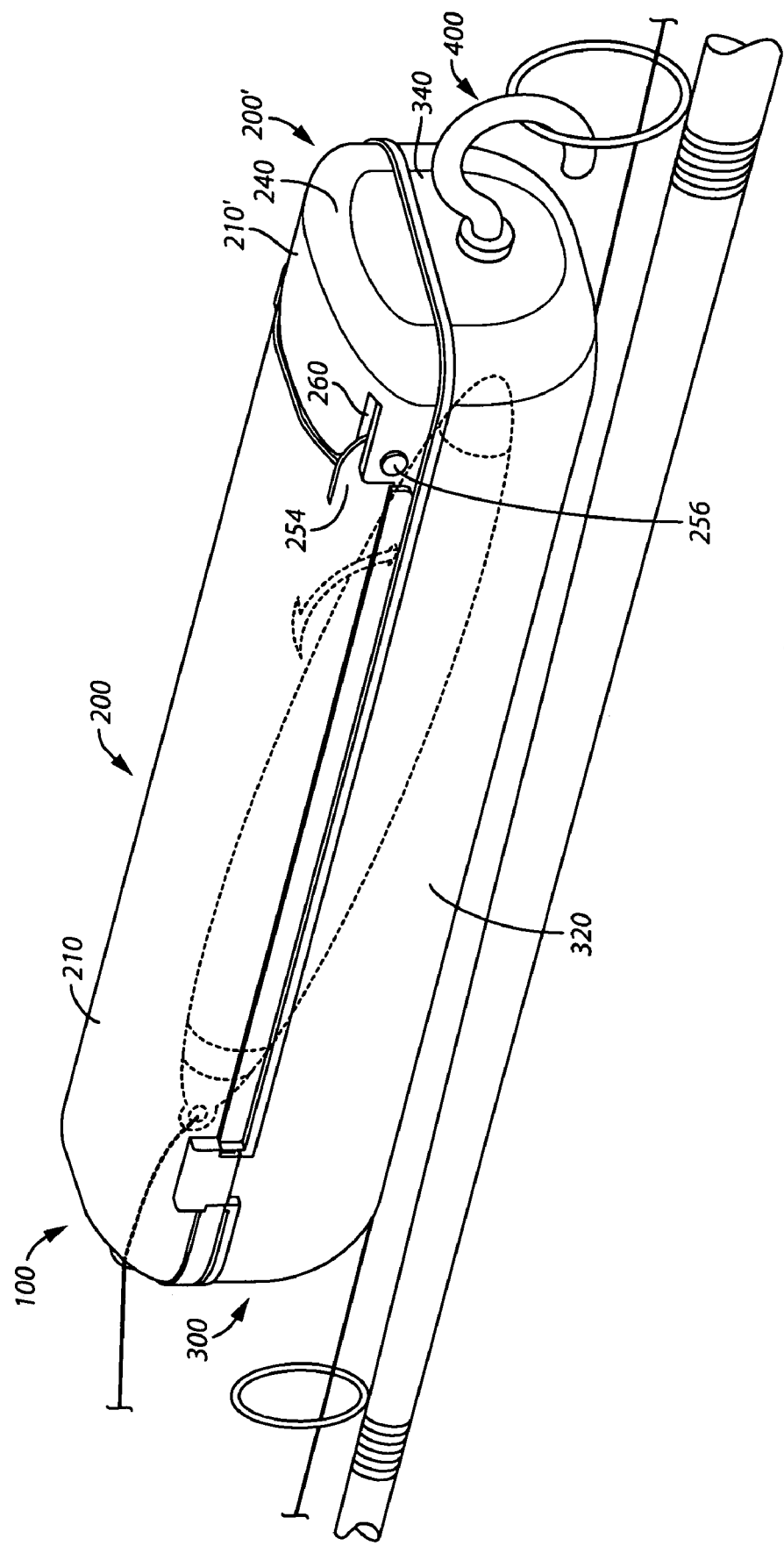
FIG. 6 is a rear perspective view of the present invention with the securing hook engaged on a fishing rod guide loop.
Figure 7:
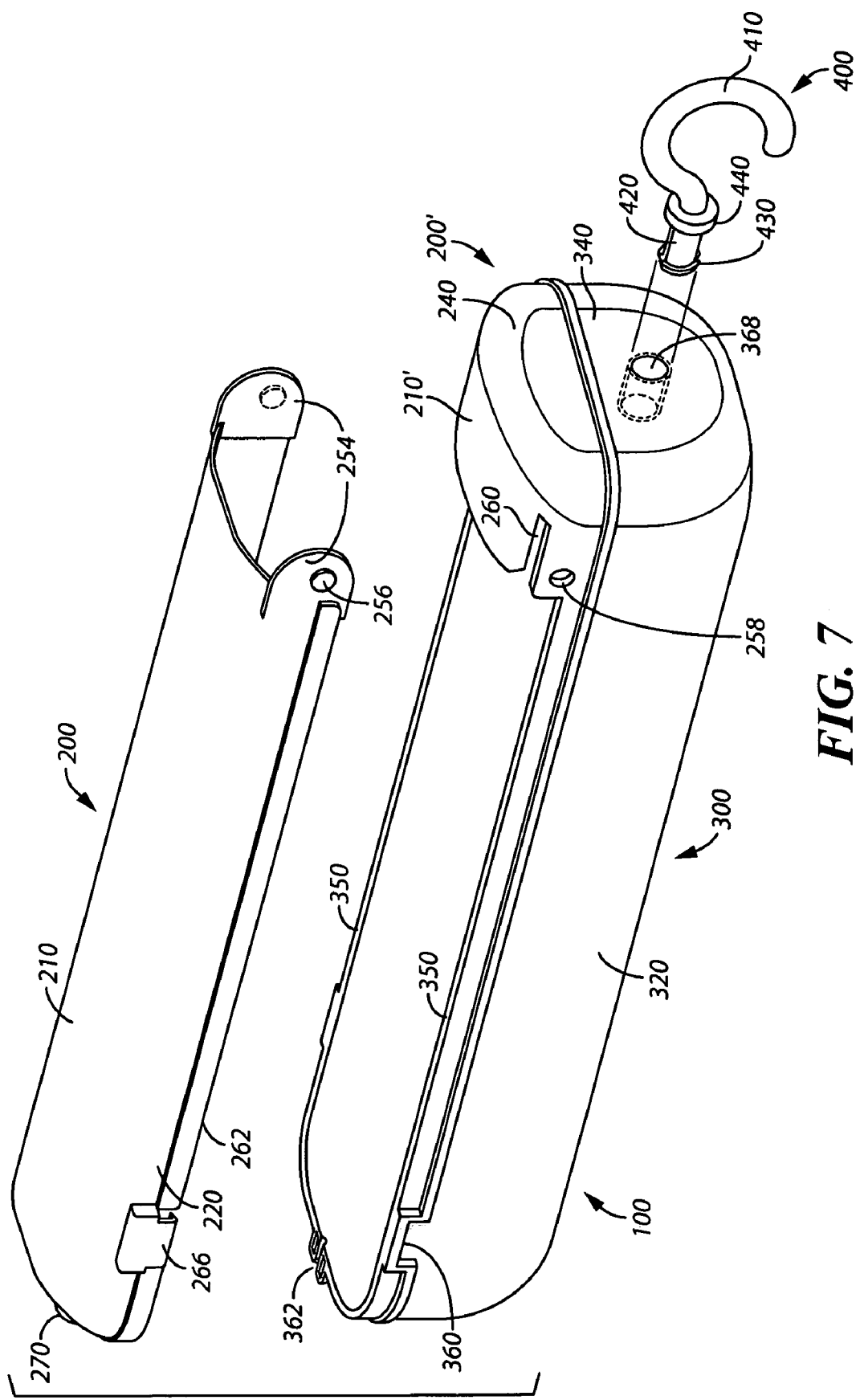
FIG. 7 is an exploded rear perspective view of the container of the present invention.
Figure 8:
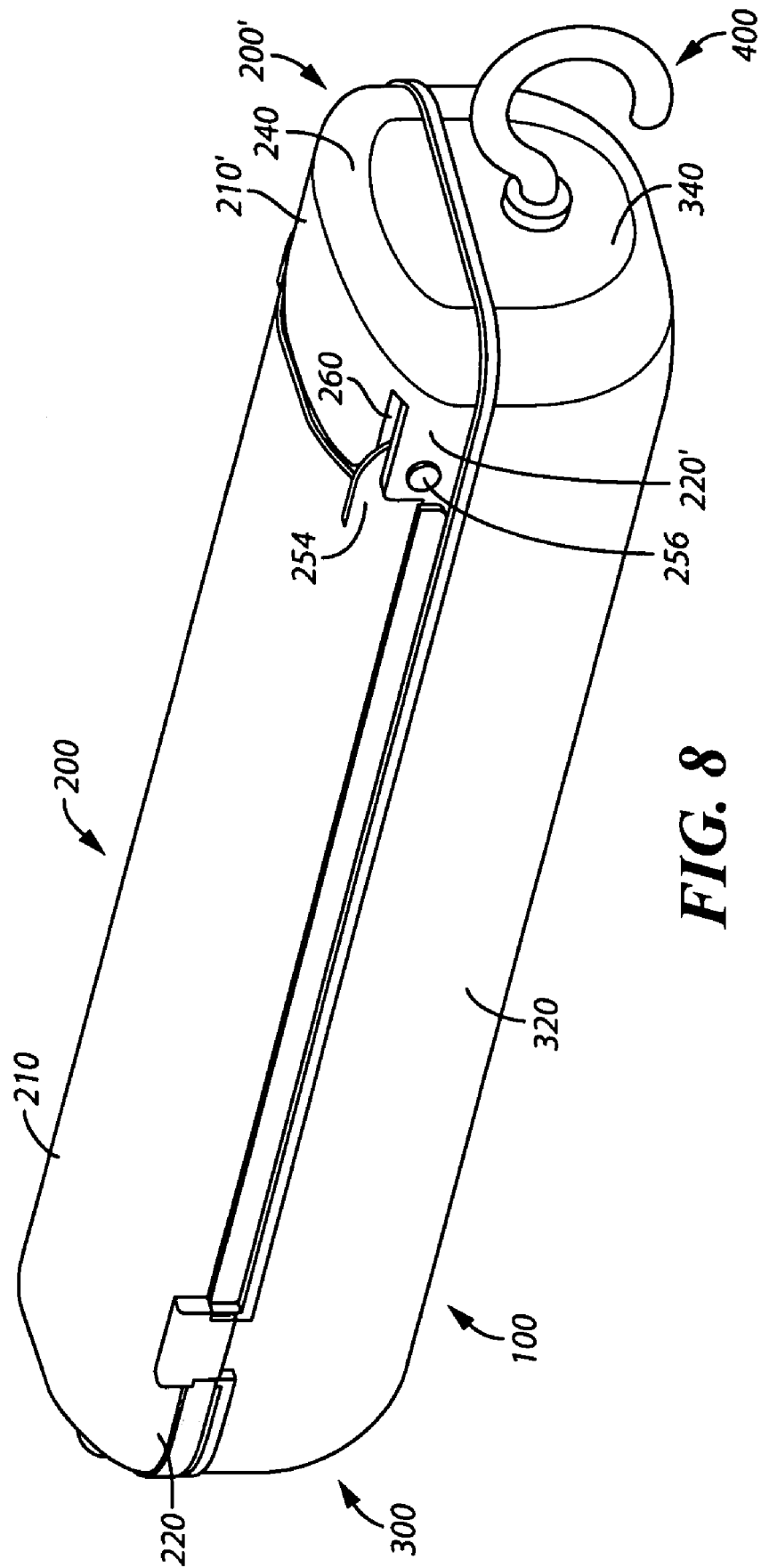
FIG. 8 is a rear perspective view of the present invention showing the movable cover section in closed position.

The fishing hook rig and lure container 100 of the present invention is shown, perspectively, in FIGS. 3-13. The container 100 is configured to have and exterior surface and an inner storage space. The container 100 comprises a cover means, a compartment 300, and a securing hook 400. Cover means preferably comprises a movable cover section 200, and a stationary cover section 200'. The movable cover section 200 comprises an elongated generally rectangular movable cover section top 210, a pair of movable cover section sides 220, extending downward from the longer edges of the movable cover section top 210, and a movable cover section front 230, extending downward from a one of the shorter sides of the movable cover section top 210. Each of the movable cover section sides 220 is joined at adjacent edges to the movable cover section front 230 to define a downward periphery in spaced apart relation to the movable cover section top 210, as shown in FIG. 7. The stationary cover section 200' comprises a stationary cover section top 210', a pair of stationary cover section sides 220' and a stationary cover section back 240, all formed in complementary character as a uniform extension of the movable cover section 200, as shown in FIG. 8.

The compartment 300, as shown in FIG. 7, preferably comprises a generally rectangular base (not shown), a pair of compartment sides 320, extending upward from the longer edges of the base, a compartment front 330, extending upward from a one of the shorter edges of the base, and a compartment back 340 extending upward from the other of the shorter sides of the base. Each of the compartment sides 320 is joined at adjacent edges to the compartment front 330 and to the compartment back 340 to define an upward periphery in spaced apart relation to the base, as shown in FIG. 7.

The upward periphery and the downward periphery are configured to align in mated relation to engage the movable cover section 200, and the stationary cover section 200' with the compartment 300, to enclose and define the inner storage space. It is preferred that the stationary cover section 200' be permanently bonded to the compartment 300. Alternatively, the stationary cover section 200' may be formed so as to be integral with the compartment 300.

Figure 9:
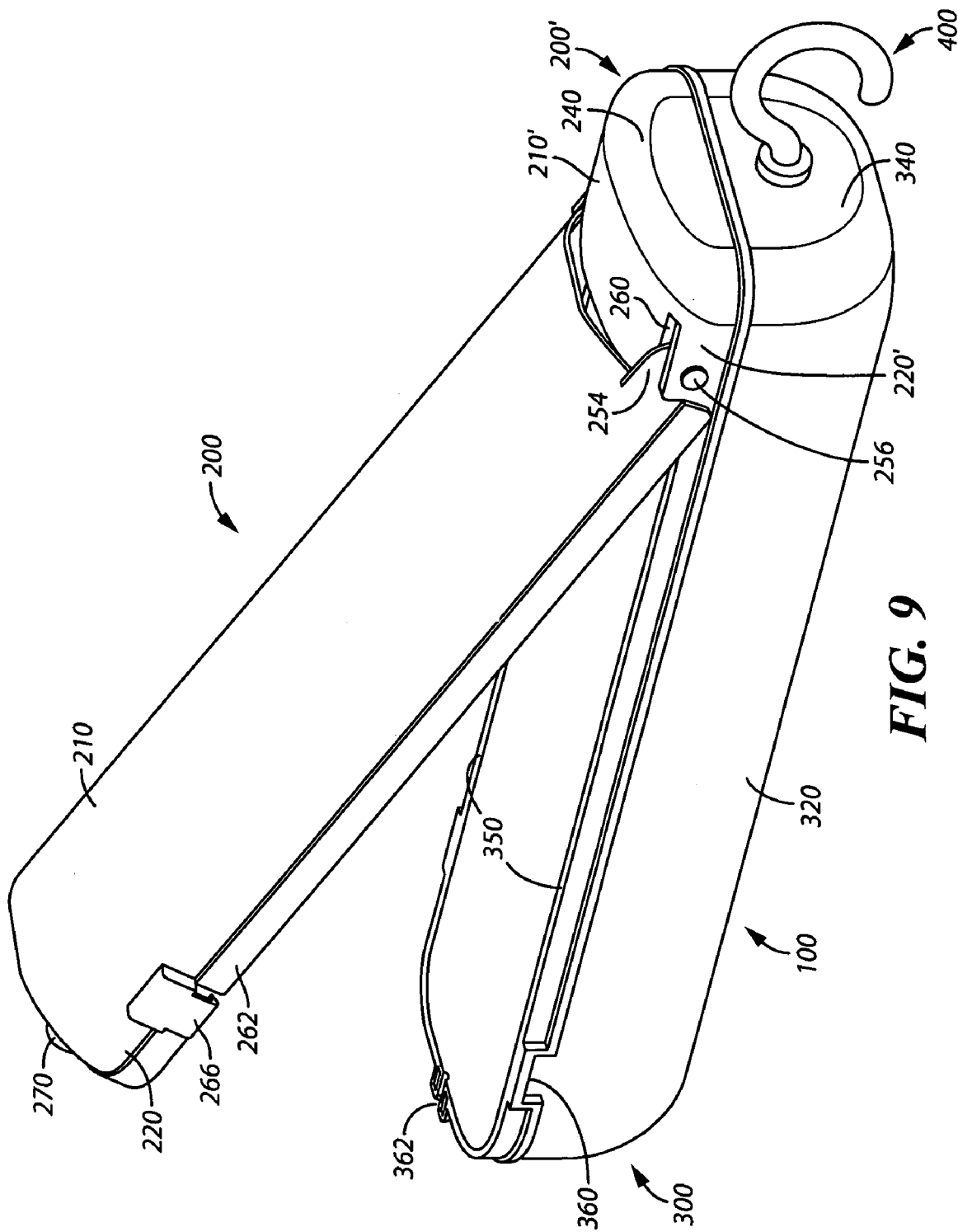
FIG. 9 is a rear perspective view of the container of the present invention showing the movable cover section in open position.

The movable cover section 200, is connected to the stationary cover section 200' by hinge means, as shown in FIGS. 7, and 10-12. The hinge means may be operated to raise the movable cover section 200, for providing access to the inner storage space. Hinge means are preferably formed of a pair of integral tabs 254 on the movable cover section sides 220, extending toward the cover back 240. Each of the pair of tabs 254 is provided with one of a pair of outwardly extending pivot pins 256. A pair of holes 258 is provided on each of the pair of stationary cover section sides 220', and positioned to receive the pair of pivot pins 256 in rotatable engagement therewith. It is also preferable that a pair of slots 260 be provided in the stationary cover section top 210', aligned with the pair of tabs 254 to allow freedom of movement of the tabs 254. The movable cover section 200 may be raised to provide access to the inner storage space, as shown in FIG. 9 and lowered to close the container, as shown in FIG. 8. It is preferred that the downward periphery, of the movable cover section 200 be provided with a first flange 262 and that the upward periphery be provided with a second flange 350 configured to meet the first flange 262 in resting engagement, as shown in FIGS. 7 and 9. When the movable cover section 200 is lowered to a closed position, the first flange 262 and the second flange 350 act as a guides to align the movable cover section 200 with the compartment 300.

The container 100 may be formed of plastic, rubber, injected molded plastic, natural and synthetic materials such as vinyl, combinations thereof, or any of a variety of other known rigid and flexible materials. It is preferred that the container 100 be formed of transparent or semi-transparent material to facilitate viewing of the contents. It is preferred that the container 100 be provided with releasable coupling means to retain the movable cover section 200 in closed position.

Figure 18:
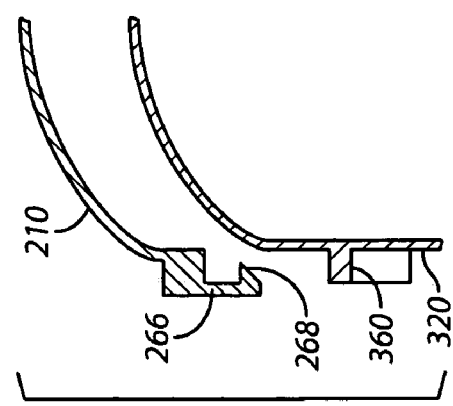
FIG. 18 is a front elevation half cross section of the container of the present invention shown with the movable cover section raised.
Figure 19:
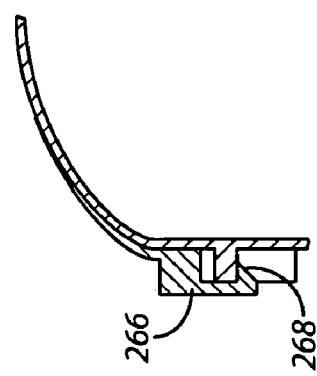
FIG. 19 is a front elevation half cross section of the container of the present invention shown with the movable cover section closed.

The releasable coupling means may comprise a squared ledge 360 on the upward periphery and a resilient hitch 266 with a tapered catch 268, on the downward periphery, as shown if FIGS. 7 and 9. The movable cover section 200 may be pressed onto the compartment 300 to engage the catch 268 on the ledge 360, for closing the container 100, as shown in FIG. 19 and the compartment sides 320 may be depressed to release the catch 268 from the ledge 360, as shown in FIG. 18, for opening the container 100. Both procedures may be practiced one-handed so that a fishing lure, which is attached to a fishing line may be maneuvered into the compartment by a user's other hand. It will be appreciated by those skilled in the art that other conventional coupling means may be incorporated with the present invention.

The compartment front 330 is provided with a lower line port 362 on the upward periphery, as shown in FIG. 14, and the movable cover section front 230 is provided with an upper line port 270 on the lower periphery, as shown in FIG. 15. The lower line port 362 includes a first channel 364 of generally semi-circular cross section positioned in transverse relation to the upward periphery. The lower line port 362 includes pair of wells 366 straddling the first channel 364 and located proximate to the upward periphery. The upper line port 270 includes a second channel 272 of generally semi-circular cross section positioned in transverse relation to the lower periphery. The upper line port 270 includes a pair of studs 274 straddling the second channel 272, located proximate to the lower periphery and sized to be received in snug fitting engagement within the wells 366. The upper line port 270 and the lower line port 362 are configured and positioned such that when the movable cover section 200 is closed, the studs 274 enter the wells 366 and serve to align the first channel 364 with the second channel 272 to form a straight unobstructed bore, which is accessible from outside the container 100 and communicates with the inner storage area, as shown in FIG. 13. FIGS. 16 and 17 depict a side view showing the upper line port 270 and the lower line port 362, with the movable cover section 200 raised in FIG. 16 and closed in FIG. 17.

Figure 20:
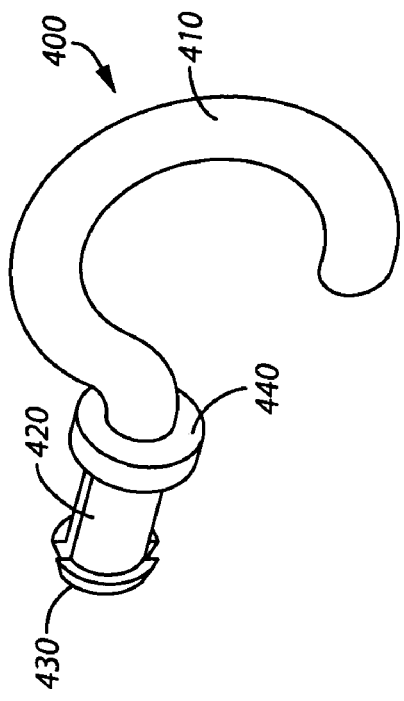
FIG. 20 is a perspective view of the securing hook of the present invention
Figure 21:
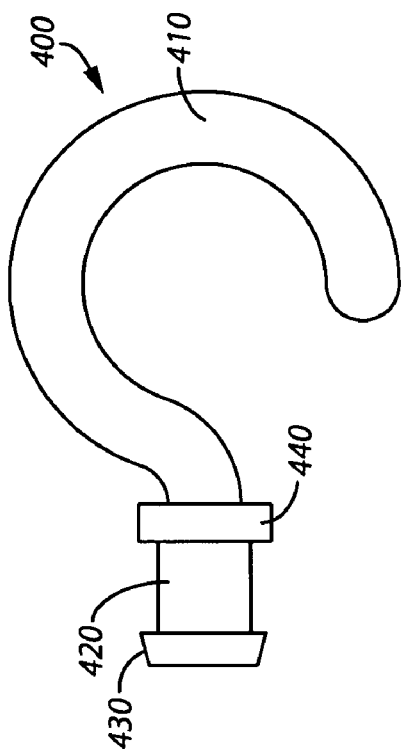
FIG. 21 is a side elevation view of the securing hook of the present invention.

The securing hook 400 is attached on the exterior surface of the container 100, as shown in FIGS. 20 and 21. The securing hook 400 preferably comprises a J-shaped load bearing portion 410 with an integral straight shank 420 formed of the same rigid and flexible material used to form the compartment 300, movable cover section 200 and the stationary cover section 200'. The distal end of the shank 420 is provided with a plug 430 and the proximal end of the shank 430 is provided with a detent 440. An aperture 368 is provided in the compartment back 340, which is sized to receive the shank 420. The plug 430 is preferably tapered so that in may be forced through the aperture 368 and retained therein, as shown in FIGS. 7 and 8. The detent 440 serves to prevent further advance of the shank 420 through the aperture 440. The J-shaped load bearing portion 410 may be engaged with a stationary fitting of a rod and reel set and is formed to have sufficient flexibility to bend and free itself in the event that a degree of tension likely to damage fishing rod guide loops or to extract guide loops from the fishing rod inserts is applied.

Figure 22:
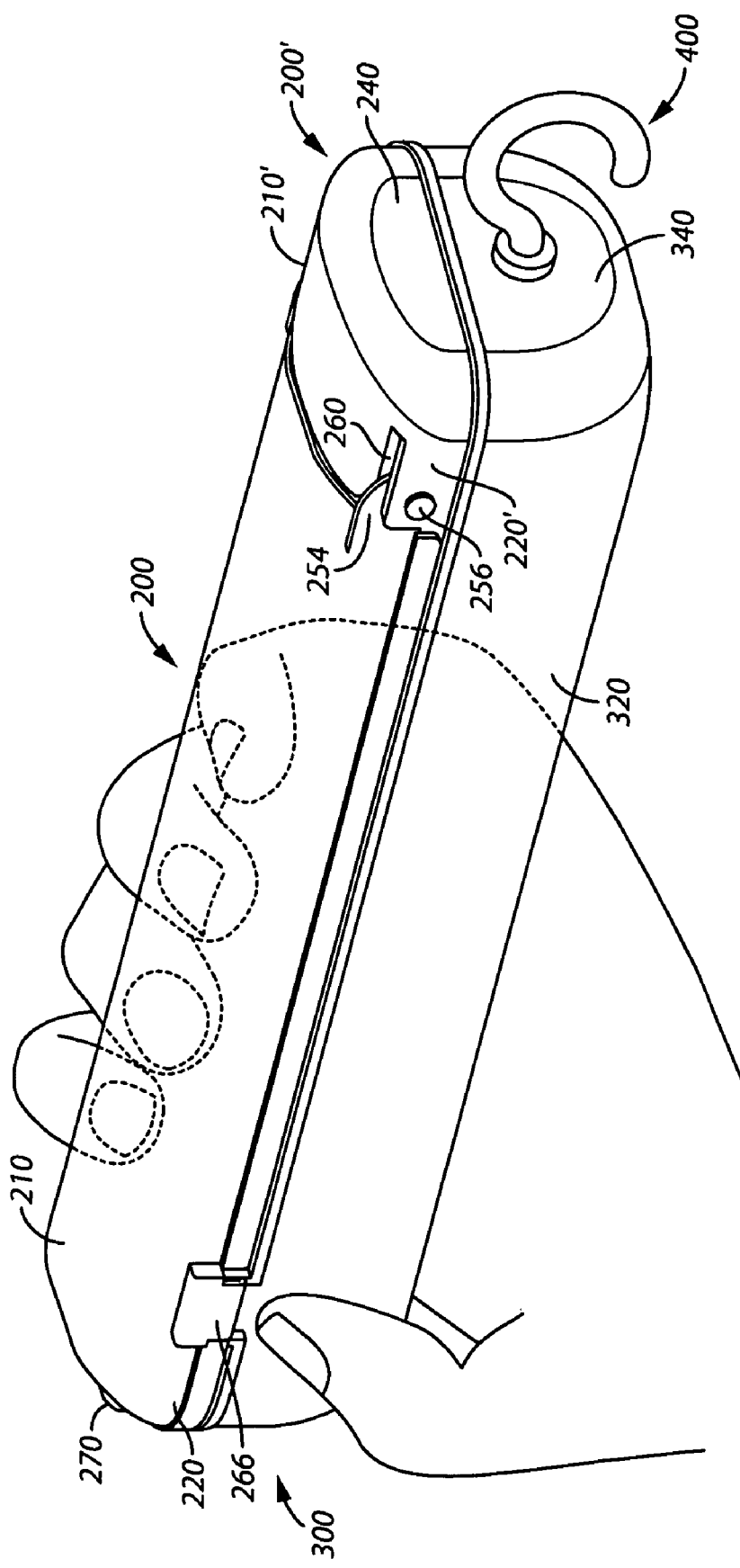
FIG. 22 is a rear perspective view of the container of the present invention with a user's hand closing the movable cover section.

In use, the compartment 300 may be manually squeezed to release the coupling means and allow the movable cover section 200 to rotate to the open position. A fishing hook rig, or lure, as shown in FIG. 3, may be inserted into the compartment 300. The attached fishing line is to be laid into the first channel 364, as shown in FIG. 4, before the movable cover section 200 is returned to the closed position. The first channel 364 and the second channel 272 may be uniformly tapered to aid in positioning the fishing line within the bore and avoid kinking. The cover 200 may be manually pressed to engage the coupling means, as shown in FIG. 22 and enclose the fishing lure within the container 100, as shown in FIG. 5. The securing hook 400 may be engaged on a stationary fitting of the fishing rod and reel set, and the reel may be operated to tension the line and position the container 100 adjacent to the fishing rod, as shown in FIG. 6. The fish hooks on the fishing lure are enclosed within the container 100 and are not exposed to contact with individuals, clothing or other fishing equipment. The fishing rod and reel set may be hand carried, stored or transported in a vehicle without the inconvenience of tangling or injury resulting from contact with an exposed fish hook. Chemical fish attractants may be applied to a fishing lure resting in the compartment 300 and the movable cover section 200 may be closed to capture and isolate the attractant material. The container 100 of the present invention may be produced in a full range of sizes to accommodate fishing hook rigs and lures of all sizes.

While the preferred embodiments of the invention have been described above, it will be recognized and understood that various modifications can be made in the invention and the appended claims are intended to cover all such modifications which may fall within the spirit and scope of the invention.

What is claimed is:

1. A fishing hook rig and lure container comprising:
cover means;
   a compartment;
   said cover means and said compartment being joined to define an inner storage space and an exterior surface;
   said cover means being operable to selectively provide access to said inner storage space;
   said cover means having releasable coupling means for retaining said cover means in a closed position;
   said cover means comprising a moveable cover section and a stationary cover section;
   said movable cover section being rotatably connected to said stationary cover section and said stationary cover section being permanently mounted on said compartment;
said releasable coupling means comprising a hitch and catch mounted on said movable cover section and a squared ledge formed on said compartment;
said hitch and catch being configured to cooperate with said squared ledge to releasably couple said movable cover section to said compartment, for maintaining said cover means in closed position;
said container having a straight bore communicating with said inner storage area, for receiving a fishing line extending from outside said container to said fishing hook rig or lure within said container; and
a securing hook mounted on said exterior surface, for engaging a fixed structure.

2. The fishing hook rig and lure container of claim 1, wherein:
   said compartment is formed of rigid and flexible material, whereby said compartment may be manually deformed for releasing said coupling means to open said container.

* * * * *